Feb. 14, 1961 S. K. ALTES 2,972,013

COLOR TELEVISION RECEIVER SYSTEM

Filed Oct. 27, 1954

4 Sheets-Sheet 1

INVENTOR:
STEPHEN K. ALTES,
BY George V. Eltgroth
HIS ATTORNEY

INVENTOR:
STEPHEN K. ALTES,
BY George V. Seltzrath
HIS ATTORNEY.

INVENTOR:
STEPHEN K. ALTES,
BY George V. Rettgrath
HIS ATTORNEY.

INVENTOR:
STEPHEN K. ALTES,
BY George V. Eltgroth
HIS ATTORNEY.

2,972,013
Patented Feb. 14, 1961

2,972,013

COLOR TELEVISION RECEIVER SYSTEM

Stephen K. Altes, Syracuse, N.Y., assignor to General Electric Company, a corporation of New York Filed Oct. 27, 1954, Ser. No. 465,009

5 Claims. (Cl. 178—5.4)

This invention relates to electrical apparatus and, more specifically, to electronic circuits for incorporation in color television receivers. It has particular application to color television receivers in which the picture tube is of the single-electron-gun type.

The type of color television signal which has been accepted in the industry is a signal composed of three components. The first of these components, which occupies the lower part of the frequency band assigned to color television transmission, is the luminance component, which is expressive only of the brightness, but not the color, of the element of scene being scanned at the time. The other two components are the so-called chrominance components, which are respectively impressed on two subcarrier waves of equal frequency but of ninety-degree phase displacement with respect to each other. These chrominance components carry the color information and occupy the upper part of the frequency band assigned to color teleevision transmission. They may be transmitted in a suppressed-subcarrier fashion.

In order to make economical use of the available frequency spectrum, provision has been made for the luminance and chrominance components to overlap each other slightly in the spectrum, a fact which renders detection of the signals slightly more difficult than it would otherwise be. However, since the detection problem can be solved, it is generally felt that the resulting economy in use of the available spectrum justifies the solution within the equipment of the additional problems caused by frequency overlap. This is particularly true since a certain bandwidth of the available transmitting frequency spectrum must be allocated to each transmitting station, and it is highly desirable that the width of such channel for color transmission be the same as the earlier assigned channels for monochrome transmission in order to permit compatibility of the color television signal with existing monochrome receivers.

It is apparent that the color television signal adopted for use by the industry has been designed mainly with its transmission properties, rather than ease of detection and reproduction of picture, in mind. A further example of this general statement is the fact that, while the commonly-accepted color television signal is fairly well adapted for actuating a receiver equipped with a picture tube possessing one electron gun for each of the three primary colors (red, green, and blue), the signal must undergo some type of modification if it is to be utilized for actuating a receiver equipped with a picture tube possessing only one electron gun. Such a receiver has the advantage of greater economy in that the manufacture thereof is easier, and there is no problem of adjustment to obtain the exact registration of images from three different electron guns. My invention is concerned with the modification or conversion which the standard color television signal must undergo in order to become suitable for actuation of a color picture tube of the signal-electron-gun type. My invention is particularly well suited for modification of a color television signal for use in a single-electron-gun picture tube having the phosphor applied to its face in a large number of stripes of the three primary colors.

The color television signal which has been adopted for use throughout the industry may be described by the following expression:

$$E_m = E_y + [M \cos \omega t + N \sin \omega t] \quad \text{Equation 1}$$

where:

$E_m$ is the total compositive video voltage applied to the modulator of the picture transmitter when a particular element of the scene is scanned;

$E_y$ is the voltage representative of the luminance or brilliance (but not the color) of the particular element of scene scanned;

M and N are voltages characteristic of certain linear combinations of voltages representing three primary color components of the color of the element of scene being scanned;

$\omega$ is the angular frequency of the subcarrier waves upon which the color information is impressed; and $t$ represents the time at which the value of $E_m$ is desired.

According to the accepted color television standards, the frequency of the subcarrier waves is 3.58 megacycles per second, and $\omega$ is $2\pi \times 3.58 \times 10^6$ radians per second. Also, according to the accepted standard, $E_y$, M, and N may be respectively represented in terms of the three primary color components of the scanned element of scene, as follows:

$$\left.\begin{aligned} E_y &= .30E_r + .59E_g + .11E_b \\ 1.14M &= -.17E_r - .33E_g + .50E_b \\ 1.14N &= .70E_r - 59E_g - .11E_b \end{aligned}\right\} \quad \text{Equation 2}$$

where:

$E_y$, M, and N are as defined above;

$E_r$ is a voltage representing the red primary color component of the element of scene scanned;

$E_g$ is a voltage representing the green primary color component of the element of scene scanned; and $E_b$ is a voltage representing the blue primary color component of the element of scene scanned.

It will be noted that, if $E_r$, $E_g$, and $E_b$ are all equal, $E_y$ will be equal to $E_r$, $E_g$, or $E_b$ and both M and N will be zero. Further, it will be noted that, in this treatment of the subject, the so-called "gamma" correction for picture-tube non-linearity is not being considered.

A signal of the type set forth in Equation 1 can be separated into its components by a process of subtraction and synchronous detection, which will produce color signals suitable for application to a color tube having an electron gun for each primary color. However, in order to make a signal of the type set forth in Equation 1 useful for actuating a color tube of the single-electron-gun type, some transformation must be made which will make available to the color tube a signal representative of the three color components in the same color sequence as that in which the electron beam strikes the colored phosphors. That is, the signal $E_m$, which may in some respects be regarded as a simultaneous signal, must be transformed into a signal which is not only definitely sequential in nature, but also sequential in the same order as the color phosphors are excited by the beam. Moreover, it is desirable that the sequential signal applied to the single-electron-gun color tube be capable of detection by symmetrical sampling in order that a harmonic of the subcarrier frequency may be used as the sampling wave. A system which provides for transformation of the color television signal into a signal capable of symmetrical sampling in the order red-green-blue-red-green-blue, etc. is disclosed in my copending application No. 411,186 filed February 18, 1954 and assigned to the same assignee as the present invention. The sampling referred to in the earlier application takes place at intervals of 120 degrees and employs the third harmonic of the subcarrier wave as the sampling wave. The invention of the present application, on the other hand, is directed especially to the case in which the picture-tube beam swings from a first color stripe of phosphor through a second color stripe of phosphor to a third color stripe of phosphor and thence back through the second color strips of phosphor to the first color stripe, whereupon the process is repeated cyclically. Since, as will be observed, the beam passes through the middle strip twice for every single time it strikes each of the other two stripes, it becomes necessary to switch four times per color cycle instead of three times as in the case previously referred to. I have found that this requirement can be satisfied by the use of a fourth harmonic of the subcarrier wave as the sampling signal. Accordingly, a system is disclosed in the following pages which makes possible the sampling of the tube signal in the sequence red-green-blue-green-red-green-blue-green-red, etc. or any other sequence in which one of the primary colors appears twice as often as each of the others. Such a sampling process may advantageously employ for the switching wave the easily generated fourth harmonic of the subcarrier wave.

In order to make possible the use of a fourth harmonic frequency as the sampling, or color-controlled wave, it is necessary that the television signal be put in a form which is symmetrical in that samples taken at 90-degree intervals therefrom will represent the color components of the element of scene in the order desired. This condition will be satisfied if the signal applied to the single-electron-gun color tube can be put in the form defined by an expression of this type:

$$E_n = \tfrac{1}{4}E_r + \tfrac{1}{2}E_g + \tfrac{1}{4}E_b + \tfrac{1}{2}(E_r - E_b)\cos(\omega t + \theta) + \tfrac{1}{2}[\tfrac{1}{2}(E_r + E_b) - E_g]\cos 2(\omega t + \theta) \quad \text{Equation 3}$$

in which:

$E_r$, $E_g$, and $E_b$ are as previously defined, and $\theta$ is a phase angle relating the components of the desired signal to one of the subcarrier waves. It will be noted that, in Equation 3, For $(\omega t + \theta) = 0$ dgrees, $E_n = E_r$
For $(\omega t + \theta) = 90$ degrees, $E_n = E_g$
For $(\omega t + \theta) = 180$ degrees, $E_n = E_b$ and
For $(\omega t + \theta) = 270$ degrees, $E_n = E_g$.

This is seen to be the sequence of colors which has been stated as desired in the output to be sampled. This is a desirable sequence because of the fact that the voltage $E_g$ is sampled twice as often as either of the other two component voltages $E_r$ or $E_b$, thereby eliminating any tendency of the green component of the image to "crawl." Since the green component contributes (according to Equation 2) more to the brightness of the average picture field than either of the other two color components, it is best to be assured of the absence of "crawl" in the green component, and to tolerate any possible crawl in the other two components of less brilliance, rather than to have any possibility of "crawl" in the green component. The possibility of crawl in some color components must be recognized because of the fact that it is difficult to sample all of the color-component voltages more than once per cycle of the subcarrier wave. Since sampling one color component more than once per subcarrier cycle can eliminate this effect for that particular color component, it seems desirable that $E_g$, which contributes the most brilliance, should be the color component voltage which receives the favored treatment. Since, however, it may be desired to sample one of the other colors twice per cycle, a discussion of how that can be done (with $E_r$ favored or $E_b$ favored) will be included in the following pages. It will be understood that the crawl effect could be completely eliminated if it were convenient to sample all of the color component voltages twice each per subcarrier cycle. However, this seems to be a comparatively inefficient method of sampling because of the large amount of time required for the switching operations, and the fact that the signal wave could not then be sampled conveniently near its peaks.

The accepted form of color television signal, as described by Equations 1 and 2, may alternatively be described by the following equation, in which the expressions of Equation 2 have been substituted into Equation 1:

$$E_m = E_y + \frac{1}{1.14}\left[\frac{1}{1.78}(E_b - E_y)\sin\omega t + (E_r - E_y)\cos\omega t\right] \quad \text{Equation 4}$$

As stated above, $E_m$ is the form of color television signal accepted for use in the industry, and represents the form of a signal which would appear at the output of the video detector of a color television receiver. A problem which I have solved is the transformation of the signal as defined by Equations 1, 2, and 4 into a signal representable by an equation of the general form of Equation 3, thereby producing a signal which may be sampled at ninety-degree intervals to produce in sequence the red, green, blue, and green components of an element of image.

Accordingly, an object of my invention is to provide apparatus capable of converting a color television signal of the commonly-accepted type into a signal which may be accurately sampled at equal time intervals.

A further object of my invention is to provide apparatus capable of transforming a color television signal of the commonly-accepted type into a signal which is definitely sequential in nature and in which one of the color components is repeated twice as often as each of the other two color components.

A more general object of my invention is to provide apparatus capable of transforming any signal which has certain sequential properties expressed by trigonometric functions into a signal which is definitely sequential in nature, whether for color television or for some other purpose.

A specific object of my invention is to provide apparatus capable of converting a color television signal of the commonly-accepted type into a signal suitable for application to a color-television picture tube of the single-electron-gun type.

Briefly, the apparatus which I have invented separates the chrominance portion from the other portions of the detected color television signal, performs certain multiplication and demodulation operations upon the chrominance portion, combines these modified parts of the chrominance portion and adds thereto an altered version of the luminance component or of the entire detected color television signal, the final result being a signal having one color component repeated twice as often as each of the other two. The multiplications above referred to are performed by means of certain harmonics of the subcarrier frequency.

For additional objects and advantages, and for a better understanding of the invention, attention is now directed to the following description and the accompanying drawings. The features of the invention which are believed to be novel are pointed out with particularity in the appended claims.

In the drawings:

Figure 2 also shows a phase shifter and filter network which may be associated with the multiplier;

Figure 3 shows also a phase shifter which may be used in conjunction with the demodulator in the circuits of my invention;

Figure 1:
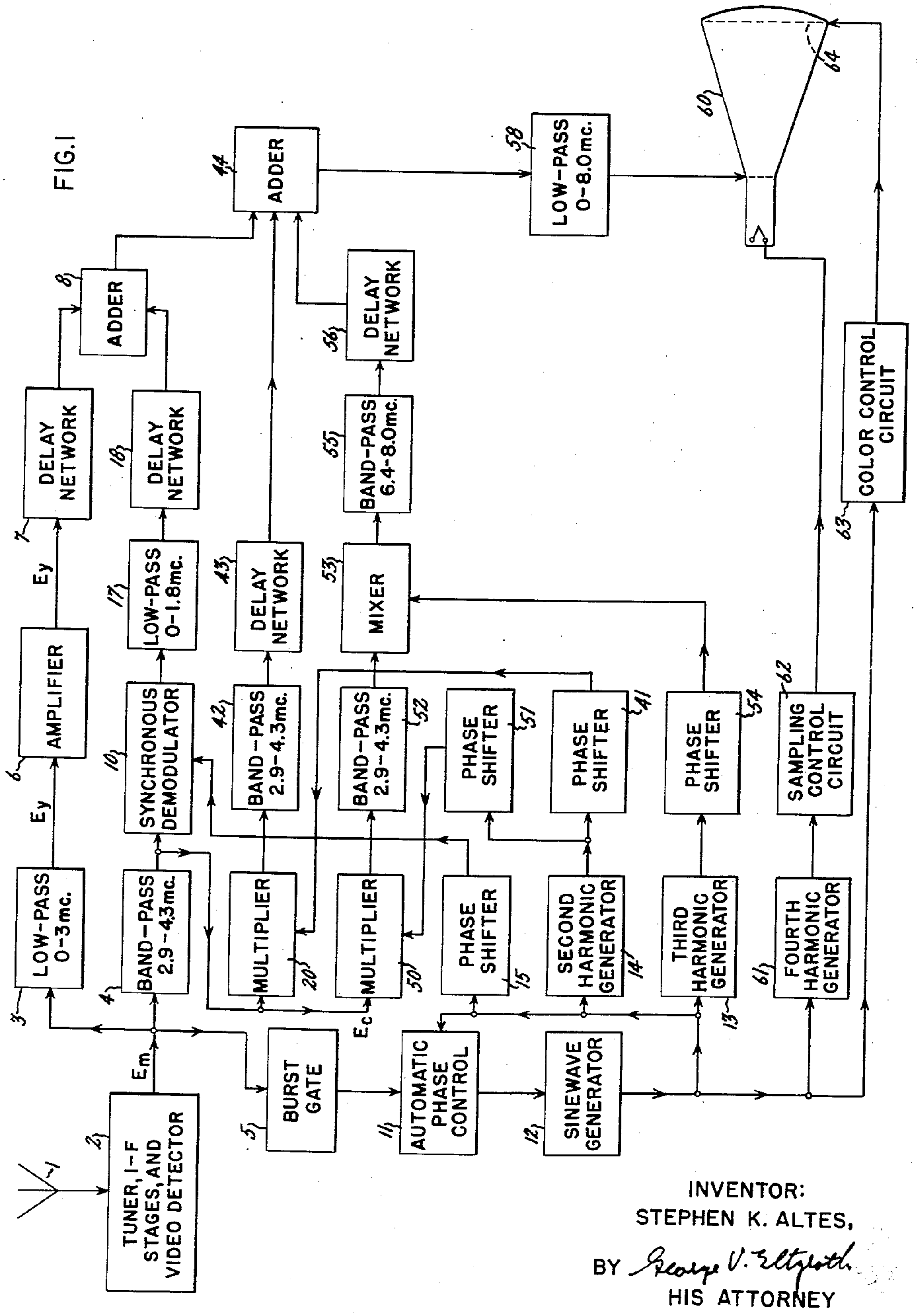
Figure 1 is a schematic circuit diagram of a color television receiver embodying the signal-transformation circuits of my invention.
Figure 4:
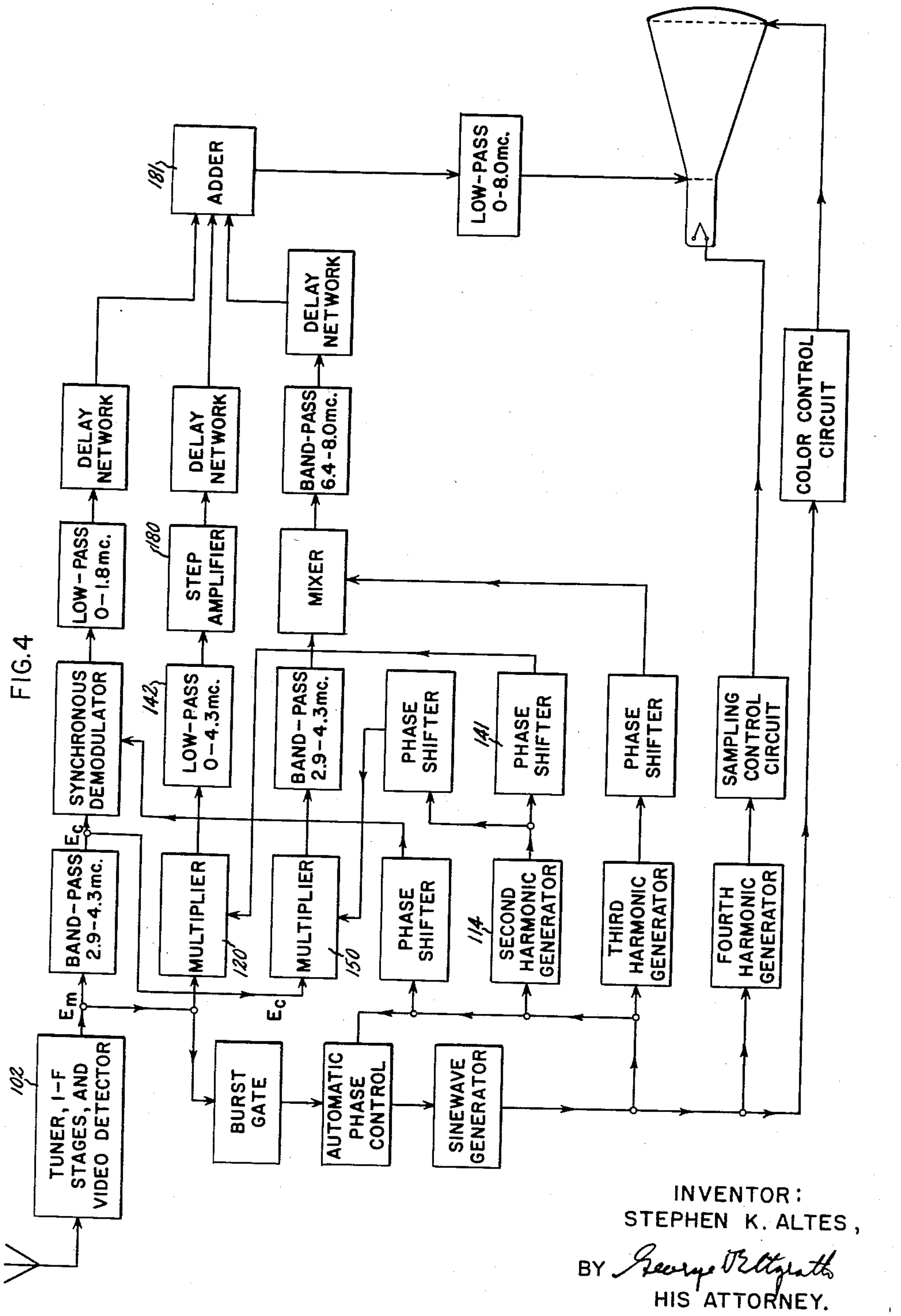
Figure 5:
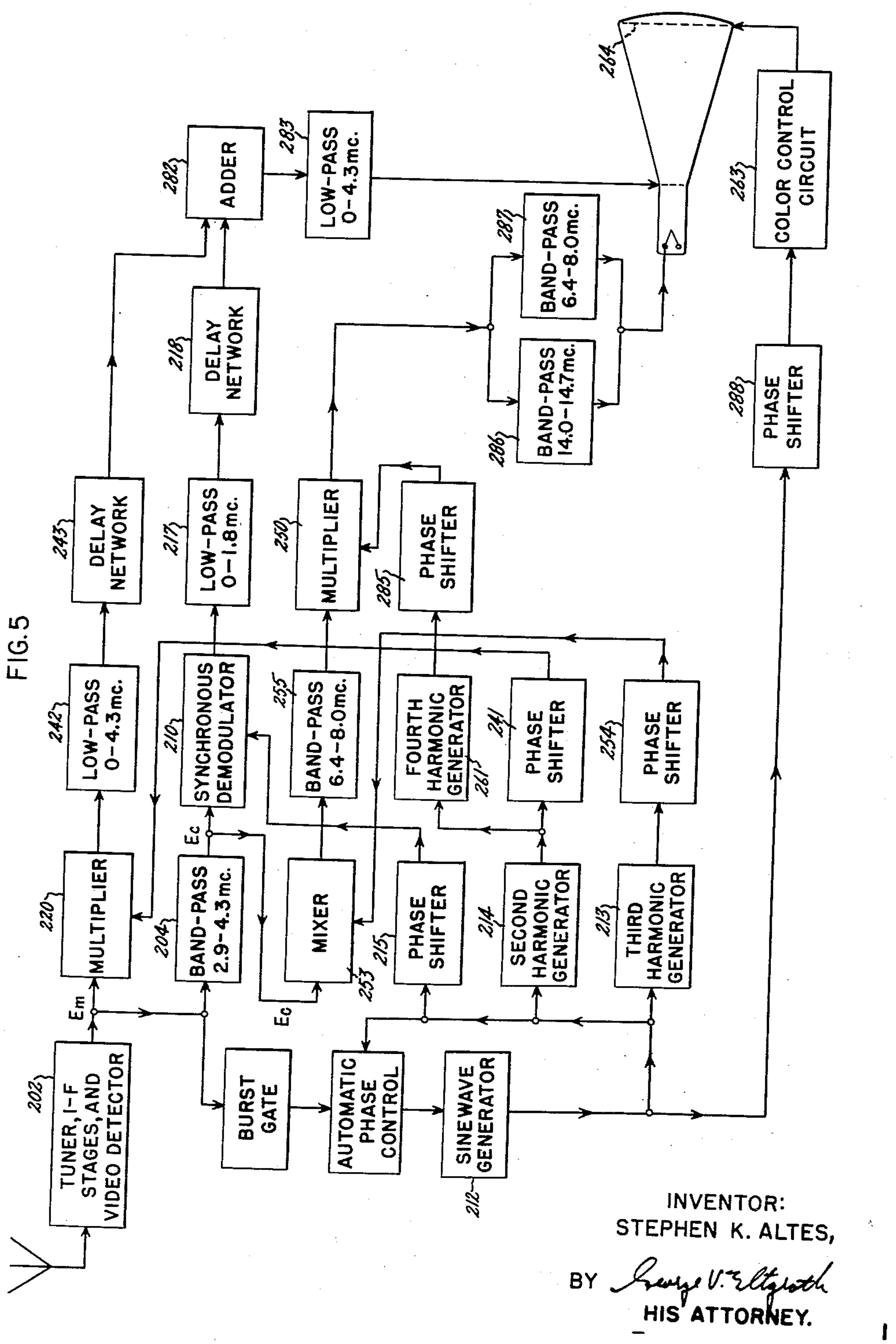

Figure 4 is a schematic circuit diagram of a modified color television receiver in which some of the signal-transformation components have been arranged in a different order from those of the circuit of Figure 1; and Figure 5 is a schematic circuit diagram of a color television receiver embodying the signal-transformation circuits of my invention in an arrangement somewhat different from that of Figure 1 or Figure 4.

Referring again to Equation 3 and the table of specific values which follows it, one may observe that, when the independent variable $(\omega t+\theta)$ takes on the values assigned, $E_n$ should represent respectively the three primary colors, with one of those colors repeated. The table represents the values which should characterize $E_n$ when it is sampled at ninety-degree intervals, assuming that it is desired to obtain the color signals successively in the order red-green-blue-green. The discussion which follows will be based upon the assumption that this is the order in which the color signals are desired. Following this discussion, a short statement will be presented showing the changes in phase relationships, etc. which should be made in order to derive color signals in a different order or with a color signal other than the green signal appearing twice as often as the other two color signals. The mathematical derivation for these latter sampling sequences will not be presented, because the derivation could be obtained by methods similar to those employed in the derivation for the red-green-blue-green sequence. Whichever sequence is desired, it will be observed that the output signal should be sampled and fed to the color picture tube or other output device four times per signal cycle.

Turning again to Equation 3, the expression for the form of signal which we desire to obtain, let us simplify the expression by making the following substitutions:

$$\left.\begin{aligned} L&=\tfrac{1}{2}E_g+\tfrac{1}{4}(E_r+E_b)\\ K&=\tfrac{1}{2}E_r-\tfrac{1}{2}E_b\\ H&=\tfrac{1}{4}(E_r+E_b)-\tfrac{1}{2}E_g \end{aligned}\right\}\quad \text{Equations 5}$$

Putting Equations 5 into Equation 3, we have:

$$E_n=L+K\cos(\omega t+\theta_1)+H\cos 2(\omega t+\theta_2)\quad \text{Equation 6}$$

Moreover, putting Equation 2 into Equation 5, we have:

$$\left.\begin{aligned} L&=E_y+0.279/1.78(E_b-E_y)-0.0042(E_r-E_y)\\ K&=\tfrac{1}{2}E_r-\tfrac{1}{2}E_y-\frac{1.78}{2}\left[\frac{1}{1.78}(E_b-E_y)\right]\\ H&=0.504(E_r-E_y)+0.611/1.78(E_b-E_y) \end{aligned}\right\}$$

Equations 7

Now, referring to Equation 4, if we let $(E_m-E_y)$ be a new quantity $E_c$ represents the chrominance portion of the composite color television signal diminished by the luminance component thereof, and $E_c$ may be defined as follows:

$$E_c=\frac{1}{1.14}\left[\frac{1}{1.78}(E_b-E_y)\sin\omega t+(E_r-E_y)\cos\omega t\right]$$

Equation 8

As has been previously explained, the function of the device of my invention is to take a signal of the form of Equation 1 or Equation 4 and transform that signal into another signal of the form of Equation 3 or Equation 6. The other equations which have been derived provide convenient definitions of signal components useful in explaining how the apparatus of my invention performs that transformation. Now, in order to make possible an understanding of the invention, a detailed description of the apparatus will be presented.

In the circuit of Figure 1, a receiving antenna 1 feeds the tuner, intermediate-frequency stages, and video detector, all of which are shown schematically by a block designated by the numeral "2." All of those components may be quite conventional and are well known in the art. The output of "block 2" is then the composite color television signal $E_m$ as defined by Equations 1, 2, and 4. The signal $E_m$ is thereupon fed to a low-pass network 3, a band-pass network 4, and a burst-gate circuit 5, all of which may be of well known construction. The low-pass network 3 should be such as to pass the luminance component $E_y$ of the composite signal but not the chrominance component $E_c$; such separation will take place if network 3 rejects all signals of frequencies higher that 3 megacycles per second. Band-pass network 4, on the other hand, should be such as to pass the chrominance component $E_c$ but to reject the luminance component $E_y$. Such a result will be obtained if the network 4 has a pass-band between 2.9 and 4.3 megacycles per second. It will be noted that this pass-band is approximately centered around the frequency of the chrominance subcarrier wave, which is 3.58 megacycles per second in the accepted form of color television signal. The operation of burst-gate circuit 5 will be briefly described in a later paragraph.

Having obtained $E_y$ and $E_c$ from filter networks 3 and 4 respectively, the operation of the rest of the apparatus upon those signals will be explained in terms of the equations which have been derived. The device of my invention attains its objective by performing various modifications on the signals $E_y$ and $E_c$ and then combining the modified signals to produce $E_n$, the desired output signal to be fed to the picture tube. Briefly, the signal-processing circuitry may be considered to comprise four roughly parallel branches, two of which operate upon $E_y$ and $E_c$ respectively, to derive therefrom two signals which can be combined to create the signal L as defined in Equation 5. A third of the parallel circuit branches operates upon $E_c$ to produce $K\cos(\omega t+\theta_1)$, as defined in Equations 5 and 6, while the fourth parallel circuit branch operates upon $E_c$ to produce $H\cos 2(\omega t+\theta_2)$ as defined in Equations 5 and 6. The outputs of these four parallel branches are then combined to form $E_n$, the desired sequential signal as defined by Equation 6. It will now be necessary to describe each of the four parallel circuit branches, together with its associated circuitry, in order to explain how the signals representing the terms on the right-hand side of Equation 6 are obtained.

The signal L is obtained by combining a signal component $E_y$, produced by a first parallel branch, with a signal component $(L-E_y)$, produced by a second parallel branch. The first branch includes low-pass filter 3 and an amplifier 6 and a delay network 7, which may be arranged in any sequence, and which feed their output to an adder 8. These circuit components may all be conventional and simply function to make available at adder 8 a signal $E_y$ in proper phase relationship with the signal delivered to adder 8 by the branch now to be described. It will be understood that the amplitude and phase of the two signals delivered to adder 8 are important only as between the two signals. That is, relative amplitude and phase are what count. Therefore, in some circumstances the amplifier may be dispensed with, and conceivably the delay network in one or more of the parallel branches will be found unnecessary.

Turning to the second parallel branch, the output of band-pass network 4, which is $E_c$, is fed to a conventional synchronous demodulator 10, in which the signal $E_c$ is multiplied with a wave of subcarrier frequency 3.58 megacycles per second, which is derived from associated circuitry. The associated circuitry will be briefly described at this point. As has been stated, the signal $E_m$ from the video detector is fed to burst-gate circuit 5, which in turn derives therefrom a phase and frequency reference on the basis of which an automatic-phase-control circuit 11 and a sine-wave generator 12 reproduce the chrominance subcarrier wave $\omega$ as defined early in this specification. The burst-gate circuit permits the obtaining of a wave of frequency $\omega$ from the "color burst," or waveform of subcarrier frequency a few cycles of which are transmitted between every two lines of color television picture signal as the image is scanned, line by line. It will be understood that the detailed means for obtaining the subcarrier waveform from the color burst is outside the scope of my invention.

Figure 3:
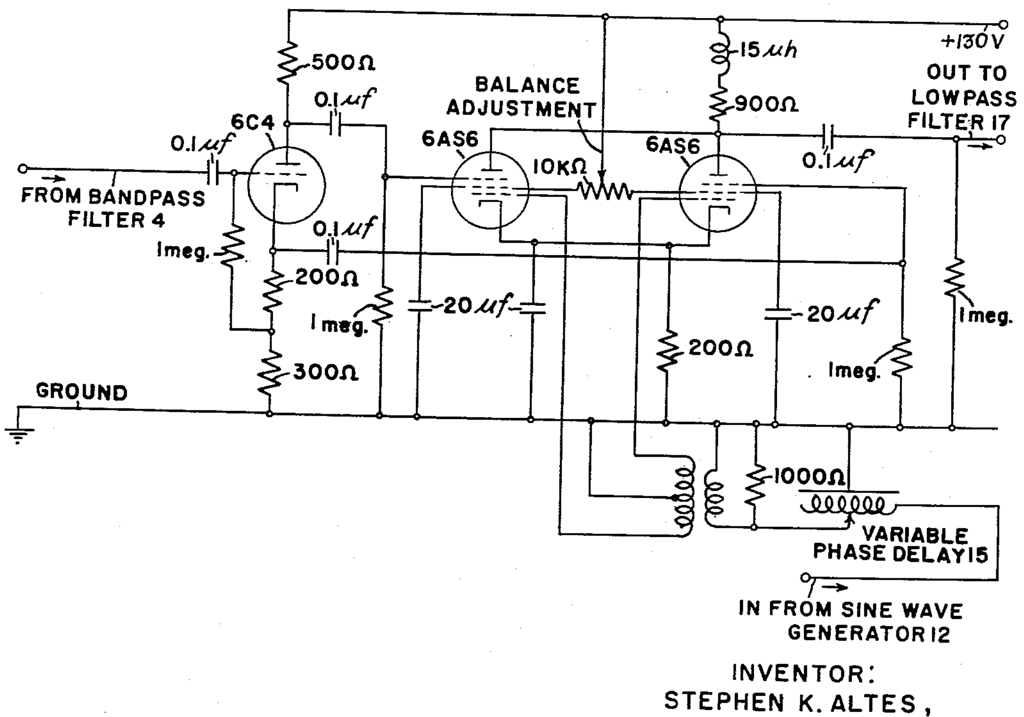
Figure 3 is a detailed circuit diagram of a demodulator which may be incorporated in the circuitry of my invention.

The regenerated wave of subcarrier frequency is fed from sinewave generator 12 to a third-harmonic generator 13, a second-harmonic generator 14, and a phase shifter 15, as well as back to automatic-phase-control circuit 11. The output of phase shifter 15 is fed to synchronous demodulator 10 in the second parallel signal-processing branch. Thus, the way in which the wave of subcarrier frequency is fed to synchronous demodulator 10 has been described. A suggested circuit diagram for synchronous demodulator 10 and phase shifter 15 is shown in Figure 3, wherein the circuitry above the ground line represents synchronous demodulator 10, while the circuitry below the ground line represents phase shifter 15. It will be observed that the input tube of the demodulator is shown as a 6C4 triode and that the plate of the triode is capacitor—coupled to the suppressor grid of one of a pair of 6AS6 pentodes. It will further be observed that the cathode of the input triode supplies a signal through another capacitor to the suppressor grid of the second of a pair of 6AS6 pentodes. Since this latter connection from the triode cathode is in the form of a cathode follower, and since the plate and cathode circuits of the triode have substantially equal resistances, this is a so-called phase-splitter type of connection. While the control grids of the pentodes receive in push-pull fashion the output of phase shifter 15, the screen grids of the two pentodes are connected to a balance potentiometer in such a way that the output taken from the plates of the pentodes will be zero when the input to the triode is zero. Thus, demodulator 10 is a balanced synchronous demodulator. It will be obvious that the input tube might be a pentode instead of a triode and that various other modifications of the circuitry shown in Figure 3 may be made without departing from my invention. In fact, any electrical circuits capable of converting the signal $E_c$ into a signal describable as the difference between L and $E_y$ may be employed. If the synchronous demodulator is such as to produce $\frac{1}{2}(L-E_y)$ instead of $(L-E_y)$, then obviously the first parallel signal-processing branch (previously described) should be such as to produce merely $\frac{1}{2}E_y$ instead of $E_y$. That is, the combined output of the two branches must be proportional to L, regardless of what each of the two branches contributes. While phase shifter 15 has in Figure 3 been shown as a center-tapped transformer fed by a variable delay line, once again, any known suitable type of phase shifter may be employed.

Having specified a suitable circuit for synchronous demodulator 10, the remaining components in the demodulator branch should be briefly described. As shown in Figure 1, the output of demodulator 10 is fed to a low-pass filter 17, wherein any signal components over approximately 1.8 megacycles per second are rejected. Filter 17 may be of any known low-pass filter construction. The output of filter 17 is fed to a delay network 18, in which suitable delay is imposed in order to insure that the outputs of delay networks 7 and 18 will be signals both of which have undergone equal delay while in transit from tuner, I.-F. stages and video detector 2. As previously stated, the outputs of delay networks 7 and 18 are combined in adder 8, which in turn may feed its output, the signal L, to another adder in which the signal L is combined with the outputs of the third and fourth parallel signal-processing branches. Alternatively, it may be possible to combine the outputs of all four parallel signal-processing branches in one adder, instead of using two adders.

It will now be explained why the output of adder 8 is indeed equal to the desired signal L. Having shown that the first parallel signal-processing branch produces an output equal to $E_y$ in proper phase, it is now necessary only to show that the output of the second parallel signal-processing branch is equal to $(L-E_y)$. In synchronous demodulator 10, the signal $E_c$ as defined by Equation 8 is multiplied with a wave of subcarrier frequency which may be described by the expression for $E_s$ as set forth below. It will be recalled that any sinusoidal wave of frequency $\omega$ may be described by the sum of a sine term and a cosine term each multiplied by a relative gain factor.

$$E_s=(2)\ (1.14)\ (h \sin \omega t+f \cos \omega t) \quad \text{Equation 9}$$

where:

$E_s$ is the wave to be delivered to demodulator 10 by phase shifter 15; and $h$ and $f$ are gain factors yet to be established.

Since $h$ and $f$ are yet to be established, it is permissible to insert the coefficient (2) (1.14) into the expression.

Upon multiplication of the expression for $E_c$ by the expression above for $E_s$, followed by elimination of the terms of frequencies higher than 1.8 megacycles per second in low-pass filter 17, a signal expressible as $0.279\times 1/1.78\ (E_b-E_y)-0.0042\ (E_r-E_y)$ may be obtained. This signal is equal to $(L-E_y)$ as defined in Equation 4 and Equation 5 and, when properly adjusted in phase, is the desired signal to be combined with the signal $E_y$ in adder 8. The identity of the above expression with the definition of $(L-E_y)$ may be shown as follows:

We recall that, according to Equation 5, L has been defined as $$\tfrac{1}{2}E_g+\tfrac{1}{4}(E_r+E_b)$$

Therefore:

$$L-E_y=\tfrac{1}{4}E_r+\tfrac{1}{2}E_g+\tfrac{1}{4}E_b-E_y$$

or $$L-E_y=\tfrac{1}{4}(E_r-E_y)+\tfrac{1}{2}(E_g-E_y)+\tfrac{1}{4}(E_b-E_y)$$

But $(E_g-E_y)$ may be shown according to the signal definitions of Equation 2 to be as follows:

$$E_g-E_y=-0.5084\ (E_r-E_y)-0.1865\ (E_b-E_y)$$

Therefore, $$L-E_y=-0.0042\ (E_r-E_y)+0.157\ (E_b-E_y)$$

or $$L-E_y=0.279\times\frac{1}{1.78}(E_b-E_y)-0.0042(E_r-E_y)$$

which is the same as the expression which has been shown to characterize the output signal from low-pass filter 17.

In order to have the above-demonstrated identity of the output of demodulator 10 with the desired signal $(L-E_y)$, it has been found that the gain factors above denominated as $h$ and $f$ should be as follows:

$$h=0.279$$
$$f=-0.0042$$
$$1.14\sqrt{f^2+h^2}=0.32$$
$$h/f=-66.45$$
$$\text{arc tan } h/f=90.9°$$

Consideration of the values of these constants shows that the over-all gain of the branch including band-pass filter 4, synchronous demodulator 10, low-pass filter 17, and delay network 18 should be substantially 0.32 times the gain of the branch containing low-pass filter 3, amplifier 6, and delay network 7. In order to have such an over-all relative gain, it may be necessary to include in the branch a suitable amplifier.

Another observation which may be drawn from the enumerated constants is that the wave supplied to synchronous demodulator 10 by phase shifter 15 should be so phased that it lags the chrominance component $(E_r-E_y)$ in synchronous demodulator 10 by substantially 90.9 degrees. Stating this requirement another way, the wave supplied from phase shifter 15 should lag the chrominance component $(E_b-E_y)$ by substantially 0.9 degree. It will be understood that, in practice, this phase relationship will be only approximately attained and that a sufficiently close approximation thereto will be attained if the wave supplied from the phase shifter 15 to demodulator 10 is in phase with the $(E_b-E_y)$ chrominance component therein.

In the preceding pages, it has been shown how the first and second parallel signal-processing branches together produce the term L of Equation 6. Now it will be shown how the term $K\cos(\omega t+\theta_1)$ is produced by a third parallel signal-processing branch. It will be recalled that K has been defined as $\frac{1}{2}(E_r-E_b)$.

The term $K\cos(\omega t+\theta_1)$ of Equation 6 is generated by means of a circuit element described in my copending patent application, Serial No. 440,171, filed June 29, 1954, and assigned to the assignee of the present invention. This circuit element is a multiplier of which the gain changes periodically at a rate equal to twice the frequency of the chrominance subcarrier wave $\omega$. The multiplier is represented by a block 20 in the schematic diagram of Figure 1 and is shown in a suggested detailed circuit form in Figure 2, which also includes a phase shifter 41 utilized in the input thereto and a band-pass filter network 42 utilized in the output thereof. The signal $E_c$ is fed from band-pass network 4 to the control grid of a tube 31 through a coupling condenser 32, while the double-subcarrier-frequency wave is supplied to the suppressor grid of tube 31 from a potentiometer 33. The voltage applied across potentiometer 33 may be derived from phase shifter 41 consisting of a delay line 34 and a resistor which is connected to ground, as is the sheath of delay line 34. The input to delay line 34 is in turn derived from a second-harmonic generator designated as block 14 in Figure 1. It will be noted that the grid-leak resistor 36 and the cathode-circuit resistor 37 and condenser 38 are conventional.

Figure 2:
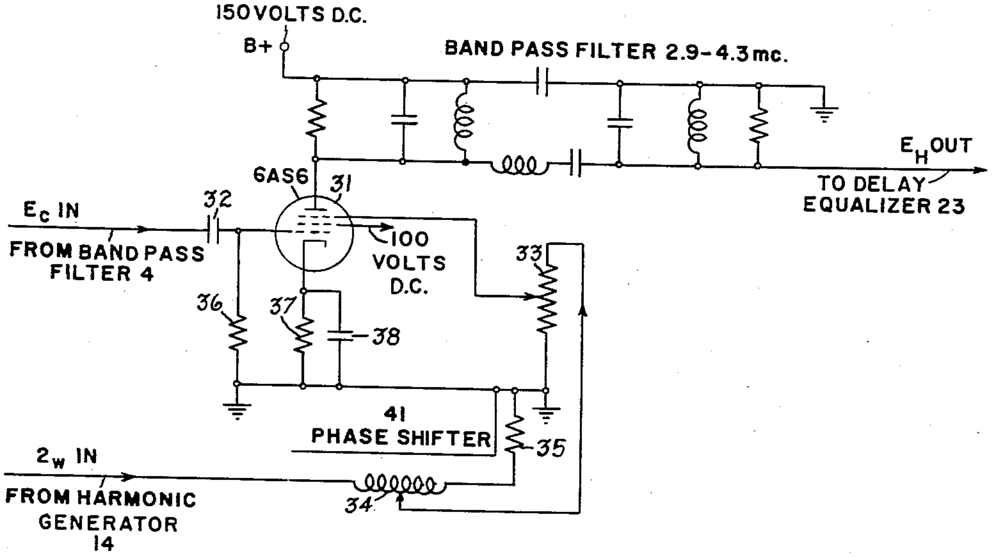
Figure 2 is a detailed circuit diagram of a multiplier which forms an important subcombination of my invention.

Turning to the circuitry which receives the output of tube 31, as shown in Figure 2, the inductors, resistors, and condensers which appear in the plate circuit constitute a conventional band-pass filter network, as represented by block 42 of Figure 1. This assembly may comprise any arrangement of components which will produce a passband extending substantially from 2.9 to 4.3 megacycles per second.

As for the mode of operation of multiplier 20, the magnitude of the double-subcarrier-frequency wave applied to the suppressor grid of tube 31 is such that it is sufficient to cause suppression of the plate current except during positive peaks of the double-frequency wave. As has been previously explained, the chrominance signal $E_c$ applied to the control grid consists of two chrominance component waves of equal frequency but of ninety-degree phase displacement with respect to each other. Thus, if the phase of the double-subcarrier-frequency wave with respect to the chrominance components of $E_c$ is adjusted until the positive peaks of the former coincide with the peaks, positive and negative, of one of the chrominance components, that particular chrominance component will be substantially suppressed. It is clear that the chrominance component having peaks coinciding with the zeros of the double-subcarrier-frequency wave will not appear to any great extent in the output because the multiplication of anything by zero gives zero as a result. After passage through band-pass network 42, the multiplier output becomes essentially a sinusoidal wave corresponding to the favored one of the chrominance components. Of course, the rejection of the disfavored quadrature component is not complete unless the peaks of the double-subcarrier-frequency wave are such as to lead to output pulses of very short duration. Such a condition would lead to a small value of gain in the multiplier. Therefore, since complete rejection of the disfavored chrominance component is not required in order to have proper operation of the device of my invention, it is possible to reach a good engineering compromise in which the output pulses are sufficiently long to allow satisfactory gain and reasonably low second-harmonic content therein while at the same time permitting a sufficiently close approach to complete elimination of one of the chrominance component signals. Passing plate current during a part of the total time ranging from one-tenth to one-third would be such an engineering compromise.

Another way to look at what takes place in multiplier 20 is as follows: The pulsed waveform applied to the tube consists of an average, or direct, component, a component at the frequency $2\omega$, and some components at frequencies equal to multiples of $2\omega$, each of which is multiplied with the signal $E_c$. The product developed by the average component gives rise to a certain amount of unchanged signal $E_c$ in the output. This fact is attributable to the incomplete elimination of one of the chrominance components of the signal $E_c$. The input component at frequency $2\omega$ gives rise to two new beat-frequency components, one at a frequency $\omega$ and the other at a frequency $3\omega$. The component at frequency $3\omega$, along with the signal of frequency $2\omega$, is rejected by band-pass filter network 42, as are the components produced by the higher harmonics in the applied pulsed waveform. Thus, the only components passed are those of frequency $\omega$, and it will be seen that one of these may be rendered negligible in magnitude. Mathematically speaking, the multiplication which takes place in multiplier 20 may be expressed as follows:

$$[1+2d\cos 2(\omega t+\theta)] \times \frac{1}{1.14}\left[\frac{1}{1.78}(E_b-E_y)\sin\omega t+(E_r+E_y)\cos\omega t\right] \quad \text{Equation 10}$$

where the first bracketed quantity represents the double-subcarrier-frequency wave supplied by second-harmonic generator 14 and phase shifter 41, and the last-bracketed quantity represents the signal $E_c$ as supplied from band-pass filter network 4 and as defined in Equation 8.

Following elimination of the harmonic components by band-pass network 42, there remains a signal expressible as follows:

$$\left[\frac{1}{1.78}(E_b-E_y)\sin\theta+(E_r-E_y)\cos\theta\right](1+d)\cos(\omega t+\theta) + \left[\frac{1}{1.78}(E_b-E_y)\cos\theta+(E_r-E_y)\sin\theta\right](1-d) \times\sin(\omega t+\phi) \quad \text{Equation 11}$$

where $d$ represents a new constant to be ascertained, and $\phi$ represents a new phase angle. If the pulses passed by multiplier 20 are made to approach zero width, the quantity $d$ will approach a valve of unity, which means that the second term of the above expression (Equation 11) likewise will approach zero, leaving a signal expressible essentially by the first term of Equation 11. This is the quadrature component which is passed by the multiplier-filter combination and is seen to have a phase such that its peaks coincide, as would be expected, with the peaks of the double-subcarrier-frequency wave supplied from harmonic generator 14 and phase shifter 41. Thus, by adjusting phase shifter 41, the output of band-pass filter 42 may be made to approximate K, or $\frac{1}{2}(E_r-E_b)$ as defined in Equation 5. It will be recalled that K was defined as $$\left[\frac{1}{2}(E_r-E_y)-\frac{1.78}{2}\left(\frac{1}{1.78}\right)(E_b-E_y)\right] \text{ or } \frac{1}{2}(E_r-E_b)$$

order that the first term of Equation 11 may equal K, it will be found that an amplification of substantially 1.16 must take place in the multiplier and band-pass filter branch; moreover, the transmitted pulses must be very narrow (i.e., $d$ approaches unity), and the peaks of the double-subcarrier-frequency wave should lead the peaks of the $(E_r-E_y)$ chrominance component wave in multiplier 20 by an angle of substantially 60.7 degrees as measured at the frequency $\omega$. It will be understood that, while the desired amplification factor and phase angle have been given with a certain degree of precision, satisfactory performance may be obtained in practice with only approximate alignment.

The phase of the output of band-pass filter network 42 may be adjusted by passing it through a delay network 43, which, like delay networks 7 and 18 in the previously-described signal-processing branches, may be conventional in nature. The output of delay network 43 then goes to an adder 44 in which it is combined with the output of adder 8 and with the output of the remaining signal-processing branch now to be described. It will be understood that the outputs of all the signal-processing branches may be combined in any suitable way, and that such combination might alternatively be achieved by means of a single adder in which all branch outputs are combined, rather than using a plurality of adders. Any adders used may be conventional in form.

Turning to the fourth and last parallel signal-processing branch, it will be noted upon observing Figure 1 of the drawings that the signal $E_c$ goes from band-pass filter 4 not only to synchronous demodulator 10 and to multiplier 20, but also to another multiplier which may be designated by the numeral 50. Multiplier 50 may be similar in construction to multiplier 20 and may follow substantially the detailed circuit diagram of Figure 2. Multiplier 50 is the first element of a signal-processing branch charged with the duty of producing the signal represented as $H \cos 2(\omega t+\theta_2)$ and defined in Equation 5 as $$\tfrac{1}{2}[\tfrac{1}{2}(E_r+E_b)-E_g] \cos 2(\omega t+\theta_2)$$

The first step in this process is the production of a signal expressible as $H \cos (\omega t+\theta)$, that is, a signal having the desired amplitude but a frequency equal to that of the subcarrier wave rather than that of the second harmonic of the subcarrier wave.

Multiplier 50, like multiplier 20, is supplied a wave of double subcarrier frequency, which stems from second-harmonic generator 14. However, instead of being derived from second-harmonic generator 14 through phase shifter 41, the double subcarrier-frequency wave supplied to multiplier 50 is derived from second-harmonic generator 14 through another phase shifter which may be designated by the numeral 51. The wave supplied to multiplier 50 from phase shifter 51 in effect changes the gain of the multiplier cyclically at a rate equal to $2\omega$. In order that the output of multiplier 50 may have an amplitude equal to the quantity H, the output pulses must be narrow, thereby causing one of the chrominance component waves to be substantially suppressed. Moreover, the gain in passing through the multiplier should be substantially 0.90, and the peaks of the double-subcarrier-frequency wave supplied from phase shifter 51 should lag the peaks of the $(E_r-E_y)$ subcarrier wave in the multiplier by an angle of substantially 50.4 degrees as measured at the frequency $\omega$. As in the case of the last-described one of the parallel signal-processing branches, it is necessary to remove harmonics of the frequency $\omega$ from the output of the multiplier. That function is performed in the presently-described signal-processing branch by a band-pass filter network 52 which passes substantially only signals of frequencies between 2.9 and 4.3 megacycles per second. The filter network may be conventional in design.

The output of band-pass filter network 52 may be substantially represented by the expression $$\tfrac{1}{2}[\tfrac{1}{2}(E_r+E_b)-E_g] \cos (\omega t-50.4°)$$

It is now necessary to transform that signal into another signal expressible as $$\tfrac{1}{2}[\tfrac{1}{2}(E_r+E_b)-E_g] \cos 2(\omega t+\theta_3)$$

that is, a signal of the same amplitude but of twice the frequency $\omega$. This operation may be performed by a mixer in which the input signal is multiplied by a wave of frequency three times that of the wave $\omega$. Such a mixer may be of the type commonly employed in superheterodyne receivers and may be designated by the numeral 53. The wave of frequency $3\omega$ to be applied to the mixer is derived from sinewave generator 12 through third-harmonic generator 13 and a phase shifter 54, which may be conventional in construction. The products of the multiplication in the mixer of the wave of frequency $\omega$ with the wave of frequency $3\omega$ are, of course, two new waves of frequencies $2\omega$ and $4\omega$ respectively. The wave of frequency $4\omega$ is rejected by a band-pass filter network 55 which should be such as to pass substantially only signals within the frequency band of 6.4 to 8.0 megacycles per second, and which may be conventional in design. Any signal component of frequency $\omega$ in the mixer output is likewise eliminated by band-pass filter network 55. The wave of frequency $2\omega$, which passes through filter network 55, may then be adjusted in phase by a delay network 56 and then combined in adder 44 with the outputs of the other parallel signal-processing branches.

It will be recognized that proper phasing of the outputs of the various parallel signal-processing branches is important and that, due to the multi-frequency nature of those outputs, different delays will be experienced in transit to the color picture tube. The phase of the signal at the output of mixer 53 will depend upon both the phase of the output of multiplier 50 and the phase of the wave of frequency $3\omega$ from third-harmonic generator 13 and phase shifter 54. While the former phase is established by the inputs to multiplier 50, the latter phase should be adjusted by means of phase shifter 54 and delay network 56 to produce the desired addition of the signals $$\tfrac{1}{2}(E_r-E_b) \cos (\omega t+\theta_1)$$

and $$\tfrac{1}{2}[\tfrac{1}{2}(E_r+E_b)-E_g] \cos 2(\omega t+\theta_3)$$

at the input to the color picture tube. One way to provide for this proper adjustment is to connect the output side of adder 44 through a low-pass filter network 58 to the grid of the color picture tube 60 and then vary the delay imposed in phase shifter 54 and delay network 56 until optimum performance is obtained. Low-pass filter network 58 should be such as to reject any stray signals having frequencies higher than 8 megacycles per second, and may be conventional in design.

If any phase shift obtained between adder 44 and the grid of the picture tube were linear with frequency, the phase relationships could be adjusted to be correct at the adder. However, since the phase shifts imposed by low-pass filter 58 and any amplifier which may possibly be interposed between adder 44 and the color picture tube will very likely be non-linear with frequency to some extent, the phases of the various signals should be adjusted to be correct at the input to the color picture tube rather than the adder. In other words, the signals will likely have to be slightly misphased at the adder in order to obtain proper phasing at the input to the color picture tube. Because of variations in circuit design, it is not possible to say in advance just what the degree of misphasing should be. Rather, the correct phase relationship may best be determined with the aid of an oscilloscope by observing the waveform at the input to the color picture tube. The phase of the third-harmonic wave supplied to mixer 53 should be adjusted until the waveform at the grid of the color picture tube becomes symmetrical with respect to an axis through the peak of the $$\tfrac{1}{2}(E_r-E_b)\cos(\omega t+\theta_1)$$

component. That is, the waveform of the signal $E_n$, as defined in Equation 6, should be symmetrical about an axis passing through the peak of the fundamental component of that signal. In order to permit sufficient latitude for phase adjustment, phase shifter 54 should be made capable of shifting the third-harmonic wave through a full 360 degrees measured at the frequency $3\omega$. Furthermore, in adjusting the phase of the various components of $E_n$, care should be taken not to misphase by 180 degrees the component $$\tfrac{1}{2}[\tfrac{1}{2}(E_r+E_b)-E_g]\cos 2(\omega t+\theta_3)$$

This precaution is necessary because a symmetrical waveform for $E_n$ may be obtained when the component $$\tfrac{1}{2}[\tfrac{1}{2}(E_t+E_b)-E_g]\cos 2(\omega t+\theta_3)$$

is either properly phased or 180 degrees out of proper phase. Reference to Equation 3 shows that, when a pure red or blue chrominance signal is supplied to the circuit of my invention, the waveform of the signal input to the picture tube should have a sharp, narrow peak if all components are properly phased. That is, when $E_g$ is zero, the large component signal of frequency $2\omega$ should cause the waveform of $E_n$ to be sharply peaked.

The above reference to the operation of the picture tube calls for further discussion of the auxiliary circuits which control the picture tube. Accordingly, it should be explained that the wave of frequency $\omega$ generated by sinewave generator 12 is fed to a fourth harmonic generator 61 which produces a wave of frequency $4\omega$ for sampling purposes. Alternatively, of course, the wave of frequency $4\omega$ might be obtained by doubling the frequency of the output of second-harmonic generator 14. The wave of frequency $4\omega$ is then utilized to actuate a sampling-control circuit 62, which may be of any suitable conventional type, and which causes the beam of the color picture tube to exist, in the circuit of my invention, only four times per cycle of the wave of angular frequency $\omega$. In other words, to prevent blurring of the colors, the color picture tube is actuated only when it is in such a condition as to sample the signal $E_n$ to determine its content of signals representing one of the primary colors, red, green, or blue. The output of the sampling control circuit may be delivered to the cathode of color picture tube 60, or to a special grid in said tube for gating purposes.

The color control is accomplished by means of a color-control circuit 63 which draws the regenerated subcarrier wave of frequency $\omega$ from sinewave generator 12 and which actuates a color-control electrode 64 that directs the color-picture-tube beam to the proper phosphors on the screen of the tube at the proper times. Specifically, the electron beam of the color-picture tube must at all times be directed so that it strikes a screen phosphor which will glow in a color corresponding to the sequential color signal which is at that instant controlling the tube. Such a color-control device, represented by the electrode 64, may comprise a variably-charged mesh of deflecting grid wires so arranged as to deflect the electron beam to the proper phosphors on the face of the tube. Since the details of such color-control mechanism are beyond the scope of my invention, any suitable known means may be employed as long as said means is capable of directing the electron beam to the color represented by the tube-actuating signal at that instant. Since the device of my invention finds principal utility in the case where one of the colors of phosphor stripes on the screen is repeated twice as often as either of the other colors, the color-control mechanism should be such as to sample the signal $E_n$ for its content of signal representing that particular color twice as often as it samples the signal $E_n$ for its content of signals representing either of the other two primary colors. The foregoing description has assumed that the favored color is green, but later in this specification an explanation will be given as to what changes should be made in the circuit performance in order to make the circuit suitable for the case where either red or blue is the favored color, the color sampled twice as often as either of the other two.

An alternative circuit arrangement is that of Figure 4, in which the luminance component $E_y$ of the video detector output, instead of being separated out from the chrominance components $E_c$ and bypassed through a signal-processing branch of its own, is allowed to remain with the chrominance components and is processed along with them in one of the multiplier branches. Thus, in the circuit of Figure 4, the composite color television signal $E_m$, which is the output of tuner, I.-F. stages and video detector 102, goes to multiplier 120. This is in contrast to the circuit of Figure 1, in which the signal $E_c$, rather than $E_m$, feeds the corresponding multiplier 20. Further, it will be noted that the circuit of Figure 4 has no independent signal-processing branch for the signal $E_y$, corresponding to amplifier 6 and delay network 7 in the circuit of Figure 1. It should be pointed out that, in the circuit of Figure 4, only the multiplier 120 in the branch for producing the signal $$\tfrac{1}{2}(E_r-E_b)\cos(\omega t+\theta_1)$$

has supplied to it the composite color television signal $E_m$, whereas the multiplier 150 in the branch for producing the signal $$\tfrac{1}{2}[\tfrac{1}{2}(E_r+E_b)-E_g]\cos 2(\omega t+\theta_3)$$

still has supplied to it the signal $E_c$, just as does the corresponding multiplier 50 in the circuit of Figure 1.

It will be noted that, in the circuit of Figure 4, the luminance component $E_y$, retained in the signal $E_m$ fed to multiplier 120, will be in effect impressed upon the double-subcarrier-frequency wave supplied to multiplier 120 from a second-harmonic generator 114 and a phase shifter 141. Then, a low-pass filter network 142, which passes substantially only signals of frequencies less than 4.3 megacycles per second, rejects the lower-sideband output signals resulting from the "beating" of the double-subcarrier-frequency wave with components of $E_y$ having frequencies less than 2.9 megacycles per second. In other words, most of the components in the output of multiplier 120 due to the interaction of the luminance signal $E_y$ with the double-subcarrier-frequency wave will be rejected by low-pass filter 142 because the difference between $(2\times3.58)$ megacycles per second and frequencies substantially less than 2.9 megacycles per second is greater than 4.3 megacycles per second and, hence, outside the filter passband. The output of low-pass filter 142 may be passed through a step amplifier 180 which supplies a gain of substantially 1.05 for frequencies equal to or above 3.58 megacycles per second while providing for substantially unity gain for frequencies appreciably below 3.58 megacycles per second. This effect may be obtained in any desired manner such as by separating the output of low-pass filter 142 into components above and below roughly 3.5 megacycles per second by means of a low-pass filter and a high-pass filter, amplifying the former more than the latter, and recombining the amplified components. The step may, of course, be made very gradual rather than sharp. Actual amplification may not be found necessary if it is desired to amplify the entire output of adder 181 rather than its component signals. It may be reiterated that the important gains and phases in the parallel signal-processing branches are the relative gains and phases between the various branches. After the outputs of the branches are combined in adder 181, the signal may be amplified to any desired level.

As has already been pointed out, the way for combining the outputs of the parallel signal-processing branches is optional; in the circuit of Figure 1, the combination is effected by means of two adders, 8 and 44, while in the circuit of Figure 4, the outputs of three signal-processing branches are directly combined in one adder 181. The latter method seems to be the more direct way of combining the signals, but even the latter method may be varied to provide some degree of simplification by producing addition of signals in the color picture tube itself. Such a method of addition depends upon the principle that two signals supplied respectively to the cathode and grid of a tube in opposite polarity are in effect added by the tube. This type of adding technique is employed in the circuit variation illustrated in Figure 5 of the drawings, which will now be briefly described.

In the circuit of Figure 5, as in the circuit of Figure 4, there is no signal-processing branch reserved exclusively for the luminance component $E_y$. Rather, the entire output signal $E_m$ from tuner, intermediate-frequency stages and video detector 202 is fed to a multiplier 220 in which $E_m$ is multiplied by a wave of double-subcarrier frequency derived from a second-harmonic generator 214 and phase shifter 241 in a way analogous to the way in which the double-frequency wave is supplied to the multipliers in the circuits of Figure 1 and Figure 4. In order to pass the product of the signal $E_y$ with the double-frequency wave, a filter network 242 with a passband of substantially zero to 4.3 megacycles per second is provided for the output of multiplier 220. The output of filter network 242 is fed in turn to a delay network 243 as in the other circuit configurations.

In the second parallel signal-processing branch of the circuit of Figure 5, the chrominance signal $E_c$ is separated out from the signal $E_m$ by a band-pass filter network 204 having a passband substantially from 2.9 to 4.3 megacycles per second, whereupon the signal $E_c$ goes to a synchronous demodulator 210 in which multiplication by a wave of subcarrier frequency takes place. The wave of subcarrier frequency is derived from a sinewave generator 212 and a phase shifter 215 as in the circuits of Figure 1 and Figure 4. The output of synchronous demodulator 210 goes to a low-pass filter network 217 and a delay network 218, whereupon the filtered and delayed output is combined with the output of delay network 243 in an adder 282 of which the output is in turn filtered in a low-pass filter 283 having a passband below approximately 4.3 megacycles per second. The output of filter 283 then goes to one of the electrodes of the color picture tube, for example, the grid.

In the third parallel signal-processing branch, the chrominance signal $E_c$ from filter 204 goes to a mixer 253 in which the signal $E_c$ is multiplied with a wave of frequency $3\omega$ derived from a third-harmonic generator 213 and phase shifter 254 as in the circuits of Figure 1 and Figure 4. The mixer output goes to a band-pass filter network 255, which passes signals of frequencies between 6.4 and 8.0 megacycles per second, and thence to a multiplier 250 in which the output of the filter network is multiplied by a wave of frequency $4\omega$ and of appropriate phase. The wave of frequency $4\omega$ is derived from a fourth-harmonic generator 261 and phase shifter 285. It will be noted that, in the circuit of Figure 5, the fourth-harmonic generator is shown as a mere frequency doubler taking the output wave from the second-harmonic generator 214 and converting it from a frequency $2\omega$ to a frequency $4\omega$. This arrangement is optional and equally satisfactory with the arrangements shown in Figure 1 and Figure 4, in which the fourth-harmonic generators quadruple the frequency of the output waves from the sinewave generator 12. In practice, it may be found desirable to derive all the harmonic waves of frequencies $2\omega$, $3\omega$, and $4\omega$ from a power-amplifier stage at the output of the circuit of my invention. Such a power-amplifier stage would be driven so hard that various harmonics would be generated and could be tapped off from the output by means of circuits tuned to the respective frequencies $2\omega$, $3\omega$, and $4\omega$.

The output of multiplier 250 in the circuit of Figure 5 goes to the parallel combination of two band-pass filters, 286 and 287 respectively, from which the signal is delivered to an electrode of the color picture tube shown in this case as the cathode thereof. Filter 286 should be such as to pass the wave of frequency $4\omega$, and may well pass signals of frequencies between 14.0 and 14.7 megacycles per second. Filter 287, on the other hand, should be such as to pass the wave of frequency $2\omega$, and may well pass signals of frequencies between 6.4 and 8.0 megacycles per second. A reason for this different filtering technique in the circuit of Figure 5, as contrasted with that employed in the circuits of Figure 1 and Figure 4, respectively, is the fact that the order in which mixer 253 and multiplier 250 appear in the circuit of Figure 5 is the inverse of the order in which the corresponding circuit elements appear in Figure 1 and Figure 4. A further modification which might be incorporated in the circuit of Figure 5 would be to connect the output of phase shifter 285 directly to the input of band-pass filter 286, without going through multiplier 250.

Since the sampling is in effect performed by the parallel signal-processing branches in the circuit of Figure 5, there is in Figure 5 no counterpart of sampling control circuit 62 of Figure 1. Instead, a wave of subcarrier frequency $\omega$, after undergoing appropriate phase shift in a phase shifter 288, is fed to a color-control circuit 263 which performs a function analogous to that of color-control circuit 63 in Figure 1. Specifically, color-control circuit 263 provides through the medium of a color-control electrode 264 for the electron beam to be deflected in such a way as to strike only phosphors of colors corresponding to the sequential color signal auctuating the color picture tube at that particular instant. It is important to distinguish this color-control function from the sampling function previously described in this specification. Whereas the color-control circuit insures that the beam of the color picture tube strikes the proper colored phosphor at the proper time, the sampling circuitry provides that the beam of the color picture tube shall not strike any phosphor except when the signal delivered to the tube represents the amount of a substantially pure color in the element of scene being transmitted at the time. In the circuit of Figure 5, the sampling function depends upon the delivery of the wave at frequency $4\omega$ through band-pass filter 286 to the cathode of the color picture tube. It will be understood that, during the positive peaks of this wave of frequency $4\omega$, the color picture tube will be substantially cut off. Of course, the method of sampling is optional, and any suitable arrangement may be employed.

The interchange in order of components of one of the signal-processing branches which appears in Figure 5, as compared with Figure 1 and Figure 4 may be explained as follows. In the circuits of Figure 1 and Figure 4, the signal $$\tfrac{1}{2}[\tfrac{1}{2}(E_r-E_b)-E_g]\cos 2(\omega t+\theta_2)$$

was built up in a signal-processing branch which first substantially eliminated one of the quadrature components from the $E_c$ and then converted the remaining quadrature component to a frequency $2\omega$. In the circuit of Figure 5, on the other hand, the complete chrominance signal $E_c$ is first converted to the frequency $2\omega$ whereupon one of the quadrature components is suppressed at the new frequency $2\omega$ rather than at the original frequency $\omega$. Because it is necessary that the gain of the multiplier 250 change at a rate equal to twice the frequency of the input signal, the wave applied in multiplier 250 must have a frequency equal to twice $2\omega$, or $4\omega$. This is the reason that multiplier 250 in Figure 5 is fed from a fourth-harmonic generator, whereas multiplier 50 in Figure 1 and multiplier 150 in Figure 4 are fed from a second-harmonic generator.

The parallel combination of filter networks 286 and 287 in Figure 5 is shown only schematically and may warrant further discussion as to ways in which the multiplier output and the sampling wave of frequency 4 may be impressed upon one of the electrodes of the color picture tube. Once again, it will be reiterated that the function of the wave of frequency $4\omega$ is to cut off the beam in the color picture tube except when the signal fed thereto represents a substantially pure color, this period of time being such as to coincide with the period of time within which the direction of the beam is such as to be fairly well centered on a phosphor of one color, rather than being spread over phosphors of different colors. A way in which this may be implemented is to feed the multiplier output through a band-pass filter having a passband substantially from 6.4 megacycles per second to 8.0 megacycles per second and then to couple into the output of the band-pass filter the sampling wave of frequency $4\omega$. The coupling may be accomplished by any well-known method such as by the use of a transformer having a tuned secondary winding. Although the passband of filter 286 in Figure 5 is shown as the band between 14.0 and 14.7 megacycles per second, it will be understood that the tuning may be carried out to any desired degree of sharpness, so long as the peak of tuning is the frequency $4\omega$, or 14.32 megacycles per second. The filter output with the wave $4\omega$ superimposed thereon is then fed to the color picture tube, which effectively adds the combined signal to the output of adder 282 and low-pass filter 283. Thus, it will be observed that the desired signal $E_n$, together with the sampling wave, is impressed upon the color picture tube in a way comparable to that in which the combined outputs of the various parallel signal-processing branches are impressed upon the color picture tube in the circuit of Figure 1.

It will be recalled that the foregoing description has been based upon the assumption that green is the color of the phosphor stripe through which the picture tube beam passes twice as often as either of the other two primary colors and that, hence, the sequence of the signal to be delivered to the color picture tube should be red-green-blue-green-red-green, etc. Now, if for some reason it should be desired to favor the color red or the color blue instead of the color green, certain changes must be made in the signal processing in order to get an output signal of the new color sequence.

First, if it should be desired to obtain a signal having the sequence red-blue-red-green-red-blue, etc., in which the red color is repeated twice as often as either of the other colors, the desired output signal effectively delivered to the color picture tube should be describable by the equation below for $E_n$. It will be understood that the signal $E_n$ may be delivered either in complete form to a single electrode of the color picture tube or in the form of two components, each component to a different electrode of the color picture tube, in which case the color picture tube effectively adds together the components and behaves as if excited by a single signal $E_n$. For the sequence in which the color red is repeated twice as often as either of the other colors:

$$E_n=\tfrac{1}{2}E_r+\tfrac{1}{4}E_g+\tfrac{1}{4}E_b+\tfrac{1}{2}(E_g-E_b)\cos(\omega t+\theta_3)+(-\tfrac{1}{2}E_r+\tfrac{1}{4}E_g+\tfrac{1}{4}E_b)\cos 2(\omega t+\theta_3)$$

whereby, for $(\omega t+\theta_3)=0°$ $E_n=E_g$
for $(\omega t+\theta_3)=90°$ $E_n=E_r$
for $(\omega t+\theta_3)=180°$ $E_n=E_b$
and
for $(\omega t+\theta_3)=270°$ $E_n=E_r$ Moreover, the wave of frequency $\omega$ by which the signal $E_c$ is multiplied in the synchronous demodulator should lag the chrominance component $(E_r-E_y)$ therein by an angle of substantially 46 degrees. If the relative gain of the signal-processing branch through which the signal $E_y$ is passed be assigned an arbitrary value of unity, the relative gain of the signal-processing branch containing the synchronous demodulator should be substantially 0.59.

Turning to the first multiplier branch, the signal-processing branch which produces the term $\tfrac{1}{2}(E_g-E_b)\cos(\omega t+\theta_3)$ of the equation for $E_n$, the branch gain relative to that of the $E_y$ channel branch should be 1.24 for signals of the frequency $\omega$. The peak of the wave of frequency $2\omega$ by which the signal $E_c$ is multiplied in this multiplier should lead the peaks of the chrominance component $(E_r-E_y)$ therein by an angle of substantially 103.7 degrees. As previously explained, the fact that phase angles are specified with some precision does not imply that operating with phase angles only approximating the specified values will not give satisfactory performance, or that such operation is outside the scope of the invention.

Turning finally to the second multiplier branch, the signal-processing branch which produces the term $$(-\tfrac{1}{2}E_r+\tfrac{1}{4}E_g+\tfrac{1}{4}E_b)\cos 2(\omega t+\theta_3)$$

of the equation for $E_n$, the branch gain relative to that of the $E_y$-channel branch should be substantially 0.83, and the peaks of the wave of frequency $2\omega$ by which the signal $E_c$ is multiplied in this multiplier should lag the peaks of the chrominance component $(E_r-E_y)$ therein by an angle of substantially 150 degrees.

Now, for the sequence in which the color blue is repeated twice as often as either of the other primary colors:

$$E_n=\tfrac{1}{4}E_r+\tfrac{1}{4}E_g+\tfrac{1}{2}E_b+\tfrac{1}{2}(E_r-E_g)\cos(\omega t+\theta_4)+(\tfrac{1}{4}E_r+\tfrac{1}{4}E_g-\tfrac{1}{2}E_b)\cos 2(\omega t+\theta_4)$$

whereby, for $(\omega t+\theta_4)=0°$ $E_n=E_r$
for $(\omega t+\theta_4)=90°$ $E_n=E_b$
for $(\omega t+\theta_4)=180°$ $E_n=E_g$
and
for $(\omega t+\theta_4)=270°$ $E_n=E_b$ Moreover, the wave of frequency $\omega$ by which the signal $E_c$ is multiplied in the synchronous demodulator should lag the chrominance component $(E_r-E_y)$ therein by an angle of substantially 81.3 degrees. If the relative gain of the signal-processing branch through which the signal $E_y$ is passed be assigned an arbitrary value of unity, the relative gain of the signal-processing branch containing the synchronous demodulator should be substantially 0.93.

Turning to the first multiplier branch, the signal-processing branch which produces the term $$\tfrac{1}{2}(E_r-E_g)\cos(\omega t+\theta_4)$$

of the equation for $E_n$, the branch gain relative to that of the $E_y$ channel branch should be substantially 0.88 for signals of the frequency $\omega$. The peaks of the wave of frequency $2\omega$ by which the signal $E_c$ is multiplied in this multiplier should lag the peaks of the chrominance component $(E_r-E_y)$ therein by an angle of substantially 12.5 degrees.

Turning to the second multiplier branch, the signal-processing branch which produces the term $$(\tfrac{1}{4}E_r+\tfrac{1}{4}E_g-\tfrac{1}{2}E_b)\cos 2(\omega t+\theta_4)$$

of the equation for $E_n$, the branch gain relative to that of the $E_y$-channel branch should be substantially 1.12, and the peaks of the wave of frequency $2\omega$ by which the signal $E_c$ is multiplied in this multiplier should lead the peaks of chrominance component $(E_r-E_y)$ therein by an angle of substantially 82.8 degrees.

Lastly, it may be well for purposes of comparison to repeat the phase and gain specifications for the sequence (originally described) in which the color green is repeated twice as often as either of the other primary colors. For this sequence:

$$E_n = \tfrac{1}{4}E_r + \tfrac{1}{2}E_g + \tfrac{1}{4}E_b + \tfrac{1}{2}(E_r - E_b)\cos(\omega t + \theta_2) + (\tfrac{1}{4}E_r - \tfrac{1}{2}E_g + \tfrac{1}{4}E_b)\cos 2(\omega t + \theta_2)$$

The wave of frequency $\omega$ by which the signal $E_c$ is multiplied in the synchronous demodulator should lag the chrominance component $(E_r - E_y)$ therein by an angle of substantially 90.9 degrees. If the relative gain of the signal-processing branch through which the signal $E_y$ is passed be assigned an arbitrary value of unity, the relative gain of the signal-processing branch containing the synchronous demodulator should be substantially 0.32.

Turning to the first multiplier branch, the signal-processing branch which produces the term $$\tfrac{1}{2}(E_r - E_b)\cos(\omega t + \theta_2)$$

of the equation for $E_n$, the branch gain relative to that of the $E_y$ channel branch should be substantially 1.16 for signals of the frequency $\omega$. The peaks of the wave of frequency $2\omega$ by which the signal $E_c$ is multiplied in this multiplier should lead the $(E_r - E_y)$ chrominance component therein by an angle of substantially 60.7 degrees.

Turning finally to the second multiplier branch, the signal-processing branch which produces the term $$(\tfrac{1}{4}E_r - \tfrac{1}{2}E_g + \tfrac{1}{4}E_b)\cos 2(\omega t + \theta_2)$$

of the equation for $E_n$, the branch gain relative to that of the $E_y$ channel branch should be substantially 0.90, and the peaks of the wave of frequency $2\omega$ by which the signal $E_c$ is multiplied in this multiplier should lag the chrominance component $(E_r - E_y)$ therein by an angle of substantially 50.4 degrees. This concludes the summary of phase and gain specifications for the three different color sequences. The phases and gains enumerated are applicable whether the circuit employed is that of Figure 1, Figure 4, or Figure 5. Thus, sufficient data have been given for obtaining, from any of the three configurations shown in the drawing, a signal $E_n$ in which any desired one of the three primary color components is sampled twice as often as either of the other two primary color components.

The specific embodiments shown and discussed have been chosen in such a way as to illustrate the principles of my invention. As is well known to those skilled in the art, the array, disposition, number, and character of circuit elements may often be varied to meet particular operating or environmental requirements without departing from the essence of the invention. The appended claims are therefore intended to cover any such modifications within the true scope of my invention.

What I claim as new and desire to secure by Letters Patent of the United States is:

1. A signal-processing network comprising a plurality of diverse branches for operating upon an input signal, said input signal comprising at least a lower-frequency component and a higher-frequency component, the frequency of said higher-frequency component being determined by at least one carrier wave, a first one of said diverse branches including multiplier means for causing the interaction of said both components of input signal with a wave of frequency substantially equal to twice that of said carrier, a second one of said diverse branches including means for causing the interaction of said higher-frequency component with a wave of frequency substantially equal to that of said carrier wave, a third one of said diverse branches including multiplier means for causing the interaction of said higher-frequency component with a wave of frequency substantially twice that of said carrier wave, said third one of said diverse branches including further a mixer for introducing into said third diverse branch a wave of frequency substantially three times that of said carrier wave, means for effectively adding the outputs of said plurality of diverse branches for application to an output device.

2. A signal-processing network comprising a plurality of diverse branches for operating upon an input signal, said input signal comprising at least a lower-frequency component and a higher-frequency component, the frequency of said higher-frequency component being determined by at least one carrier wave, a first one of said diverse branches including multiplier means for causing the interaction of both components of said input signal with a wave of frequency substantially twice that of said carrier, a second one of said diverse branches including means for causing the interaction of said higher-frequency component with a wave of frequency substantially equal to that of said carrier, a third one of said diverse branches including a mixer for introducing into said third diverse branch a wave of frequency substantially three times that of said carrier wave, said third one of said diverse branches including further a multiplier for causing interaction between a first factor consisting of that part of the output signal of said mixer having frequencies approximating twice that of said carrier wave and a second factor consisting of a wave having a frequency substantially four times that of said carrier wave, means for effectively adding the outputs of said plurality of diverse branches for application to an output device.

3. Apparatus for obtaining an output signal for application to a color television picture tube, said output signal representing in succession the relative amounts of three primary colors in an element of image being scanned, the representation of one of said three primary colors being repeated twice as often as the representation of either of the other two primary colors, comprising means for supplying an input signal including a lower-frequency component and a higher-frequency component, said higher-frequency component being characterized by a frequency established by at least one carrier wave, means for multiplying both components of said input signal by a periodic wave having a frequency substantially twice that of said carrier wave, means for separating said higher-frequency component from another portion of said input signal, means for demodulating part of said higher-frequency component, means for multiplying another part of said higher-frequency component by a wave of frequency substantially twice that of said carrier wave, means for mixing the product of said last-named multiplication with a wave of frequency substantially three times that of said carrier wave, and means for combining the products of said first-named multiplication, said demodulation, and said mixing, the result of said combination being the formation of said desired output signal.

4. Apparatus for obtaining an output signal for application to a color television picture tube, said output signal representing in succession the relative amount of three primary colors in an element of image being scanned, the representation of one of said three primary colors being repeated twice as often as the representation of either of the other two primary colors, comprising means for supplying an input signal including a lower-frequency component and a higher-frequency component, said higher-frequency component being characterized by a frequency established by at least one carrier wave, means for multiplying both components of said input signal by a sine wave having a frequency substantially twice that of said carrier wave, means for separating said higher-frequency component from another portion of said input signal, means for demodulating part of said higher-frequnecy component, means for mixing another part of said higher-frequency component with a wave of frequency substantially three times that of said carrier wave, means for multiplying the result of said mixing by a wave of frequency substantially four times that of said carrier wave, and means for combining the products of said first-named multiplication, said demodulation, and said last-named multiplication, the result of said combination being the formation of said desired output signal.

5. A signal processing network comprising a plurality of diverse branches for operating upon an input signal, said input signal comprising at least a lower frequency component and a higher frequency component, the frequency of said higher frequency component being determined by at least one carrier wave, a first one of said diverse branches including multiplier means for causing interaction of both components of said input signal with a wave of a frequency substantially twice that of said carrier, a second one of said branches including means for causing interaction of said higher frequency component with a wave of frequency substantially equal to that of said carrier wave, a third of said diverse branches including a third means for causing the interaction of said higher frequency component with a wave of frequency N times that of said carrier wave, said third one of said diverse branches further including a fourth means for causing interaction between a first factor derived from said third means with a wave of a frequency N plus 1 times that of said carrier wave, the quantity N assuming integral plural values, means for effectively adding the outputs of said plurality of diverse branches for application to an output device.

References Cited in the file of this patent

UNITED STATES PATENTS

| | | |
|---|---|---|
| 2,668,189 | Reddeck | Feb. 2, 1954 |
| 2,734,940 | Loughlin | Feb. 14, 1956 |